United States Patent [19]

Bunker

[11] Patent Number: 4,691,804

[45] Date of Patent: Sep. 8, 1987

[54] PORTABLE TREE SEAT AND PLATFORM FOR STANDING

[76] Inventor: Robert L. Bunker, 429 Crows Mill Rd., Fords, N.J. 08863

[21] Appl. No.: 817,295

[22] Filed: Jan. 9, 1986

[51] Int. Cl.$^4$ .................. A01M 31/02; A45F 3/26
[52] U.S. Cl. .................. 182/187; 108/152; 108/92
[58] Field of Search .................. 182/187, 188, 92; 108/152

[56] References Cited

U.S. PATENT DOCUMENTS

| | | | |
|---|---|---|---|
| 2,126,457 | 8/1938 | East | 248/217.4 |
| 3,719,252 | 3/1973 | Tiley | 182/187 |
| 3,729,160 | 4/1973 | D'Imperio | 182/187 |
| 3,990,537 | 11/1976 | Swenson | 182/187 |
| 4,413,706 | 11/1983 | Michael | 182/92 |
| 4,552,246 | 11/1985 | Thomas | 182/187 |

Primary Examiner—Reinaldo P. Machado
Attorney, Agent, or Firm—Ezra Sutton

[57] ABSTRACT

A portable tree seat and platform for standing is provided which is completely stable and avoids the drawbacks of the prior art tree seats which have a tendency to pivot or rock. The portable tree seat includes a substantially flat seat member, a screw threaded fastening member for threaded penetration of a post or tree, a V-shaped stabilizing member attached at its wide end to the seat member, and having a peg member connected to the lower end of the V-shaped member and having a penetrating point thereon for penetrating a post or tree to which the portable seat is adapted to be attached to. Thus, the seat member is totally adjustable in any direction to insure that the seat is always maintained in a horizontal plane relative to the ground and relative to its longitudinal and transverse axes, regardless of the tree angle or configuration.

4 Claims, 5 Drawing Figures

PORTABLE TREE SEAT AND PLATFORM FOR STANDING

FIELD OF THE INVENTION

The present invention relates to a portable tree seat and platform for standing and, more particularly, to an improved device which is extremely stable and which does not have a tendency to pivot or rock when it is mounted on a tree or post.

BACKGROUND OF THE INVENTION

Portable tree seats are generally well known. One typical example includes the device shown in U.S. Pat. No. 3,990,537. Although it includes a seat member and a tree penetrating peg member and a screw member, the seat has been found to be unstable and has a tendency to pivot or rock about its longitudinal axis. This results from the fact that the peg member and screw member are both connected to the seat along the same longitudinal axis, about which the seat member has a tendency to pivot and rock and is thus unstable.

Another example is U.S. Pat. No. 3,719,252 which also includes a seat member, a screw member, and dual peg members. However, the screw member and peg members are both connected to the seat along the same longitudinal axis and again, this results in an unstable construction in which the seat has a tendency to rock or pivot about the longitudinal axis. In addition, in cases where trees are slanted, one of the peg members will not be embedded in the tree and thus render the device even more unstable. The same drawback is found in U.S. Pat. No. 3,728,160.

Broadly, it is an object of the present invention to provide an improved portable tree seat and platform for standing which overcomes one or more of the foregoing drawbacks. Specifically, it is within the contemplation of the present invention to provide an improved portable tree seat which is completely stable and does not have a tendency to pivot or rock about the longitudinal axis of the seat, as in the prior art devices.

It is a further object of the present invention to provide an improved portable tree seat which includes a stabilizing member having a triangular configuration which prevents the tendency of the seat to pivot or rock about its longitudinal axis.

It is a still further object of the present invention to provide an improved portable tree seat which is usable on trees disposed at any angle or in any configuration.

SUMMARY OF THE INVENTION

Briefly, in accordance with the principles of the present invention, an improved portable tree seat is provided which includes a substantially flat seat member having top and bottom surfaces, and a screw threaded fastening member mounted on the front end of the seat member for threaded penetration of a post or tree to which the portable seat is adapted to be attached. In the preferred embodiment, the screw threaded fastening member is pivotally mounted on the front end of the seat member. In addition, there is provided a V-shaped stabilizing member which is attached at its wide end to a supporting framework for the seat member. In the preferred embodiment, the wide end of the V-shaped stabilizing member is pivotally connected to the supporting framework of the seat.

Further, the portable seat includes a peg member connected to the lower end of the V-shaped stabilizing member, and the tip of the peg member is provided with a penetrating point for penetrating a post or tree to which the portable seat is adapted to be attached to. Advantageously, as a result of the present invention, there is provided an improved portable tree seat which, after being attached to a post or tree, by the screw threaded fastening member and the peg member, is completely stable. This is the result of the V-shaped stabilizing member which provides a stable triangular support for the portable seat.

BRIEF DESCRIPTION OF THE DRAWINGS

Further objects, features, and advantages of the present invention will become apparent upon the consideration of the following detailed description of a presently preferred embodiment when taken in conjunction with the accompanying drawings, wherein.

DETAILED DISCUSSION OF PREFERRED EMBODIMENT OF THE INVENTION

Figure 1:
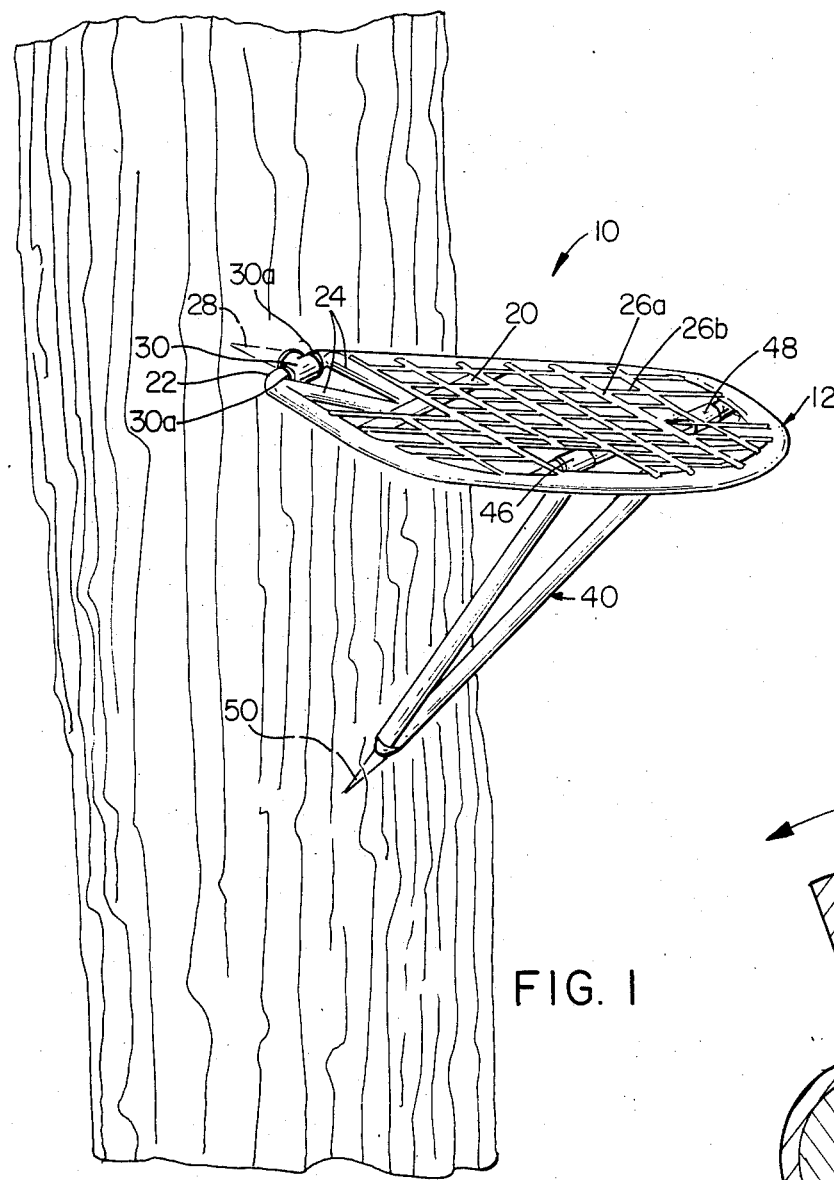
FIG. 1 is a perspective view of a portable tree seat and platform for standing in accordance with the present invention.
Figure 5:
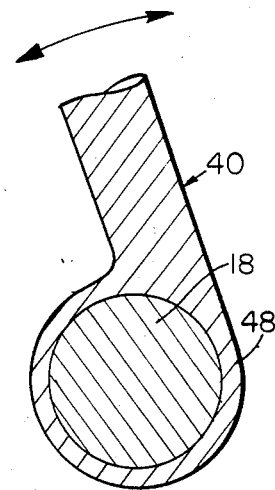
FIG. 5 is a detail view of the pivoting stabilizing member.
Figure 4:
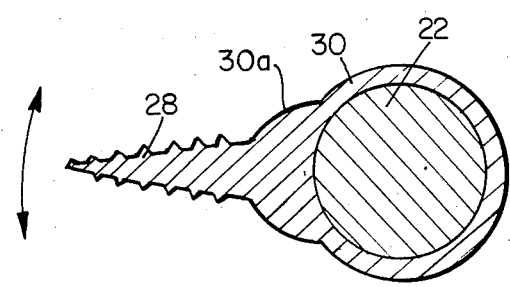
FIG. 4 is a detail view of the threaded member.
Figure 2:
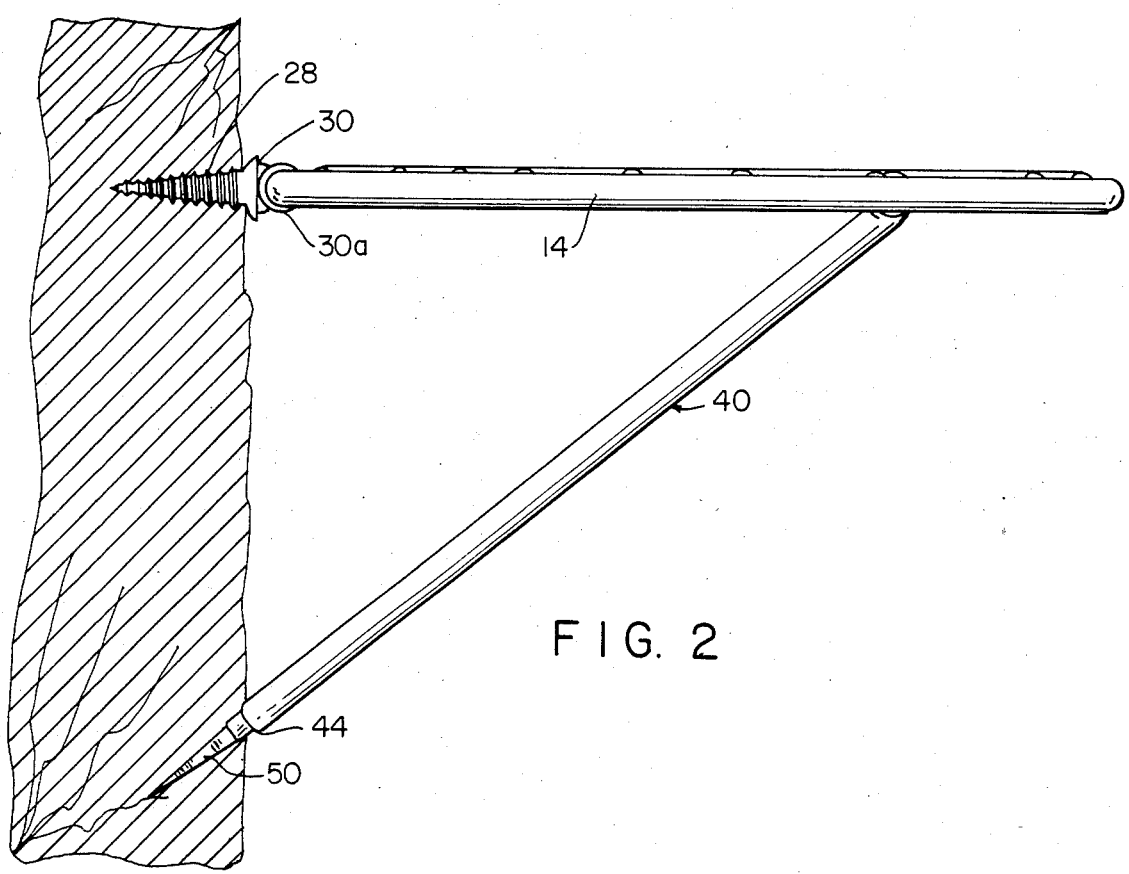
FIG. 2 is a side elevational view showing the portable tree stand attached to a tree or post.
Figure 3:
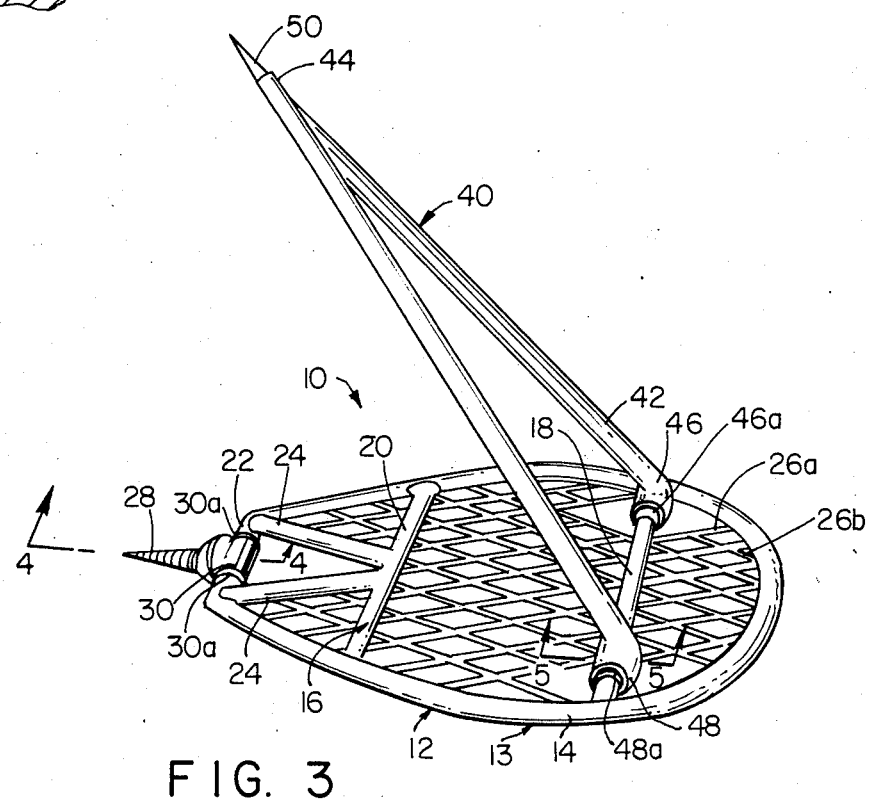
FIG. 3 is a bottom perspective view.

Referring now to the drawings, there is shown a portable tree seat 10 embodying the principles of the present invention. There is provided a substantially flat seat member 12 having a supporting framework 13 which includes an outer frame member 14 having a somewhat oval shape, and an inner supporting frame comprised of a number of elements. They include transverse bars 18, 20, and 22 which are connected to the outer frame 14. In addition, the inner framework 16 includes supporting legs 24 which form a V-shaped configuration between transverse bars 20 and 22. The seat member 12 is provided with a suitable metal grating for sitting which has an upper surface 26a and a lower surface 26b.

The portable tree seat 10 also includes a screw threaded fastening member 28 which is pivotally mounted on transverse bar 22 by a rotatable member 30. Collars 30a are welded to transverse bar 22 to prevent member 30 from moving laterally along transverse bar 22. This allows the seat to be adjusted to a horizontal position after screw thread 28 has been threaded into the post or tree. In addition, when screw threaded member 28 is not in use, it may be pivoted 180 degrees into position between V-shaped members 24 which cooperate to form a safety storage compartment to protect users from injury by the pointed screw member 28.

The portable tree seat 10 further includes a V-shaped stabilizing member 40 which has a wide end 42 and a lower tip 44. The wide end of the V-shaped stabilizing member 40 is pivotally mounted on transverse bar 18 by rotatable members 46 and 48. Collars 46a and 48a are welded to transverse bar 18 to prevent members 46 and 48 from moving laterally along transverse bar 18. In addition, the lower tip 44 has connected to it a penetrating peg member 50 for penetrating a post or tree. Since V-shaped stabilizing member 40 pivots relative to seat member 12, it allows adjustment of the seat into the desired horizontal position.

The base of screw member 28 is provided with a widened spherical stop member 30a for limiting penetration into the tree and for inhibiting lateral movement of the seat 12 relative to stop member 30a.

In operation, the screw threaded fastening member 28 is screwed into the tree post until it is fully embedded in the tree. Then the penetrating peg member 50 is driven into the tree until it is fully embedded, but the position of the V-shaped stabilizing member 40 is positioned such that the seat member 12 is horizontally disposed relative to the tree or post. Screw member 28 pivots about transverse bar 22 and also rotates about its own axis relative to member 30. These two directions of movement allow the seat to always be adjusted to a horizontal plane relative to the ground, regardless of the tree angle or configuration. More particularly, the seat is maintained in a horizontal plane relative to its longitudinal and transverse axes.

Advantageously, as a result of the present invention, the portable tree seat or stand 16 is totally stable and cannot pivot or rock about its longitudinal axis and is in a horizontal plane relative to its transverse axis. Transverse bar 18 and V-shaped stabilizing member 40 together form a triangular configuration which supports the seat member in a totally stable manner, and the seat member 12 has no tendency to rock or pivot about the longitudinal axis through the center of the seat, as in the prior art devices.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A portable seat comprising:
    a seat member having top and bottom surfaces;
    a screw threaded fastening member pivotally mounted on the front end of said seat member for threaded penetration of a post or tree to which said portable seat is adapted to be attached, the base of said screw member adjacent to said seat member being enlarged to form a spherical stop member which bears against the tree or post as the screw member is threaded into the post or tree and which limits the penetration of the screw member into the post or tree and provides stability to the seat member and prevents lateral movement with respect to the tree or post;
    said seat member including a supporting framework having a storge compartment for receipt of said screw threaded fastening member when not in use;
    a V-shaped stabilizing member pivotally attached at its wide end to said seat member for preventing pivoting of said seat member; and
    a peg member connected to the lower end of said V-shaped member and having a penetrating point for penetrating a post or tree to which said portable seat is adapted to be attached.

2. A portable seat in accordance with claim 1 wherein said supporting framework includes two parallel and spaced transverse bars, and wherein the wide end of said V-shaped stabilizing member is pivotally mounted on one of said transverse bars.

3. A portable seat in accordance with claim 1 wherein said supporting framework includes an outer frame and an inner frame, said screw fastening member being pivotally mounted on said outer frame.

4. A portable seat comprising:
    a seat member having top and bottom surfaces;
    a supporting framework for said seat member;
    said supporting framework comprising an outer frame which defines the shape of the portable seat and includes a front portion, a rear portion, and two side portions which extend between said front and rear portions to define said outer frame;
    said seat member being secured to said framework;
    a screw threaded fastening member pivotally mounted on the front end of said supporting framework for threaded penetration of a post or tree to which said portable seat is adapted to be attached, said fastening member being movable relative to said seat member;
    a first transverse bar secured to side portions of said outer frame adjacent the rear portion of said outer frame;
    a second transverse bar secured to side portions of said outer frame adjacent the front portion of said outer frame;
    said first and second transverse bars being generally parallel to each other;
    a pair of frame members secured between said second transverse bar and said front portion of said outer frame and spaced apart to provide a storage opening, aligned with an opening in said seat member, into which said screw threaded fastening member can be pivoted for storage when said portable seat is not in use;
    a V-shaped stabilizing member attached at its wide end to said seat member; and
    a peg member connected to the lower end of said V-shaped member and having a penetrating point for penetrating a post or tree to which said portable seat is adapted to be attached.

* * * * *

UNITED STATES PATENT AND TRADEMARK OFFICE
CERTIFICATE OF CORRECTION

PATENT NO.   :   4,691,804

DATED        :   September 8, 1987

INVENTOR(S)  :   Robert L. Bunker

It is certified that error appears in the above-identified patent and that said Letters Patent is hereby corrected as shown below:

Column 1, line 33, change "3,728,160" to --3,729,160--.

Column 3, line 20, change "16" to --10--.

Signed and Sealed this

Fifth Day of April, 1988

Attest:

DONALD J. QUIGG

*Attesting Officer*  *Commissioner of Patents and Trademarks*